(12) United States Patent
Ridl et al.

(10) Patent No.: US 8,693,357 B1
(45) Date of Patent: Apr. 8, 2014

(54) APPARATUS AND METHOD FOR TESTING EQUIPMENT IN A SIMULATED AFDX NETWORK ENVIRONMENT

(75) Inventors: Philip T. Ridl, Cedar Rapids, IA (US); Benjamin W. Scilley, Marion, IA (US); Robert L. Eickhorst, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 541 days.

(21) Appl. No.: 12/885,900

(22) Filed: Sep. 20, 2010

(51) Int. Cl.
*H04L 12/26* (2006.01)
*G01R 31/08* (2006.01)
*G06F 11/00* (2006.01)

(52) U.S. Cl.
USPC ........... 370/252; 370/217; 370/225; 370/245; 370/250

(58) Field of Classification Search
USPC .......................................................... 370/252
See application file for complete search history.

(56) References Cited

U.S. PATENT DOCUMENTS

| | | | | |
|---|---|---|---|---|
| 4,390,837 | A * | 6/1983 | Hotvedt .................. | 324/754.03 |
| 6,937,029 | B2 * | 8/2005 | Gambardella et al. ........ | 324/627 |
| 7,406,050 | B2 * | 7/2008 | Calluaud et al. ............. | 370/250 |
| 7,971,109 | B2 * | 6/2011 | Andreoletti et al. .......... | 714/708 |
| 8,032,032 | B2 * | 10/2011 | Chand et al. .................. | 398/140 |
| 8,064,347 | B2 * | 11/2011 | Dietz et al. .................... | 370/241 |
| 8,190,727 | B2 * | 5/2012 | Henkel .......................... | 709/223 |
| 8,275,494 | B1 * | 9/2012 | Roth .............................. | 701/3 |
| 8,451,860 | B2 * | 5/2013 | Kinstler ......................... | 370/468 |
| 8,452,475 | B1 * | 5/2013 | West et al. ................... | 701/29.1 |
| 8,468,006 | B2 * | 6/2013 | Casteres et al. ................ | 703/21 |
| 8,503,439 | B2 * | 8/2013 | Monnier ........................ | 370/384 |
| 2005/0220029 | A1 | 10/2005 | Calluaud et al. | |
| 2006/0215568 | A1 | 9/2006 | Smith | |
| 2008/0239973 | A1 * | 10/2008 | Cabaret et al. .............. | 370/250 |
| 2009/0010174 | A1 * | 1/2009 | Dessertenne ................ | 370/250 |
| 2009/0073984 | A1 * | 3/2009 | Jackson ...................... | 370/394 |
| 2009/0122812 | A1 * | 5/2009 | Steiner et al. ............... | 370/503 |
| 2010/0057899 | A1 | 3/2010 | Henkel | |
| 2010/0312506 | A1 * | 12/2010 | Taylor .......................... | 702/59 |
| 2011/0239210 | A1 * | 9/2011 | Kotani et al. ................. | 717/171 |
| 2011/0251739 | A1 * | 10/2011 | Tomas et al. ..................... | 701/3 |
| 2012/0043808 | A1 * | 2/2012 | Berkhahn et al. ............. | 307/9.1 |
| 2013/0073698 | A1 * | 3/2013 | Ling et al. .................... | 709/220 |

FOREIGN PATENT DOCUMENTS

TW 226169 * 1/2005

OTHER PUBLICATIONS

Philip Ridl, "Issues with Ethernet Parametric Testing in a Production Enviornment" AUTOTESTCON 2009 IEEE Sep. 14-17, 2009 pp. 113-115.*

Ken Bisson, Troy Troshynksi, "Switched Ethernet Testing for Avionics Applications" AUTOTESTCON 2003 IEEE Systesm Readiness Technology Conference Sep. 22-25, 2003 pp. 546-550.*

* cited by examiner

*Primary Examiner* — Melvin H Pollack
(74) *Attorney, Agent, or Firm* — Donna P. Suchy; Daniel M. Barbieri

(57) ABSTRACT

A system for automated testing of Ethernet signals of a unit under test (UUT) in a simulated Avionics Full Duplex (AFDX) network environment. The UUT may be any Ethernet device, including a 24 port Ethernet switch. Ethernet signal are received from a UUT by a measurement module that is adapted to modify the Ethernet signals according to a condition indicative of an AFDX network environment. Such modification includes attenuating the Ethernet signals with an RF attenuator or terminating the Ethernet signals with a 10 Base-T Ethernet simulation circuit. Modified signals are then monitored or evaluated to determine functionality of the UUT.

22 Claims, 3 Drawing Sheets

APPARATUS AND METHOD FOR TESTING EQUIPMENT IN A SIMULATED AFDX NETWORK ENVIRONMENT

BACKGROUND

This invention relates to automated testing of Ethernet devices, and more specifically relates to testing Ethernet devices in a simulated Avionics Full DupleX (AFDX) network environment.

Ethernet type networks are common in terrestrial telecommunications for implementing communication among various network components. Information in digital form is sent and routed in data packets or frames. Ethernet networks have the ability to send and route large amounts of data at high speeds, and are also preferred because of a variety of inexpensive and readily available Commercial Off The Shelf (COTS) components.

Ethernet based communication has evolved from terrestrial-based telecommunication into avionic systems. In an avionics network environment, the Ethernet network typically utilizes different equipment (e.g. line replaceable units (LRUs)) that subscribe to the airborne network and connect to each other through switches. When the Ethernet switch receives the packets, it determines the destination equipment and directs or switches the packets to such equipment. Recently, Ethernet COTS devices have found their way into avionics network in order to provide increased bandwidth and to reduce cost of data communication systems.

Avionic networks, however, presents several unique challenges not found in terrestrial telecommunications environment. For example, if an Ethernet device fails mid-flight it cannot simply be replaced in-flight without disrupting communication and possibly jeopardizing the safety of the flight. Therefore, stringent testing requirements have evolved in order to insure only properly functioning COTS devices are in operation prior to the flight.

In view of the foregoing, it is beneficial to provide methods and systems to automate the testing of Ethernet devices in a simulated AFDX network environment prior to installation in an avionics communication network.

SUMMARY

According to the present invention, there is provided a system for automated testing of Ethernet signals of a unit under test (UUT) in a simulated Avionics Full Duplex (AFDX) network environment. The UUT may be any Ethernet device, including a 24 port Ethernet switch. Ethernet signal are received from a UUT by a measurement module that is adapted to modify the Ethernet signals according to a condition indicative of an AFDX network environment. Such modification includes attenuating the Ethernet signals with an RF attenuator or terminating the Ethernet signals with a 10 Base-T Ethernet simulation circuit.

A switching module receives the modified Ethernet signals and defines a path of communication to a data storage module. A display module coupled to the data storage module retrieves the data representative of the Ethernet signal's characteristics, such as differential signal, amplitude symmetry, rise time, fall time, duty cycle distortion, transmit jitter, and overshoot for display.

In another embodiment of the invention, there is provided a method of automating the testing of Ethernet signal of a UUT in the simulated AFDX network environment. Ethernet signals are received from the UUT and modified according to the condition indicative of an AFDX network environment. A path of communication is defined, to a data storage module and thereafter displayed on a display module.

In yet another embodiment, there is provided a device for receiving and modifying Ethernet signals to simulate the AFDX environment. A measurement module receives and modifies the Ethernet signals from the UUT. A measurement probe measures the modified Ethernet signals for transmission to a switching module that defines a path of communication to a display module.

Other features and aspects of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1:
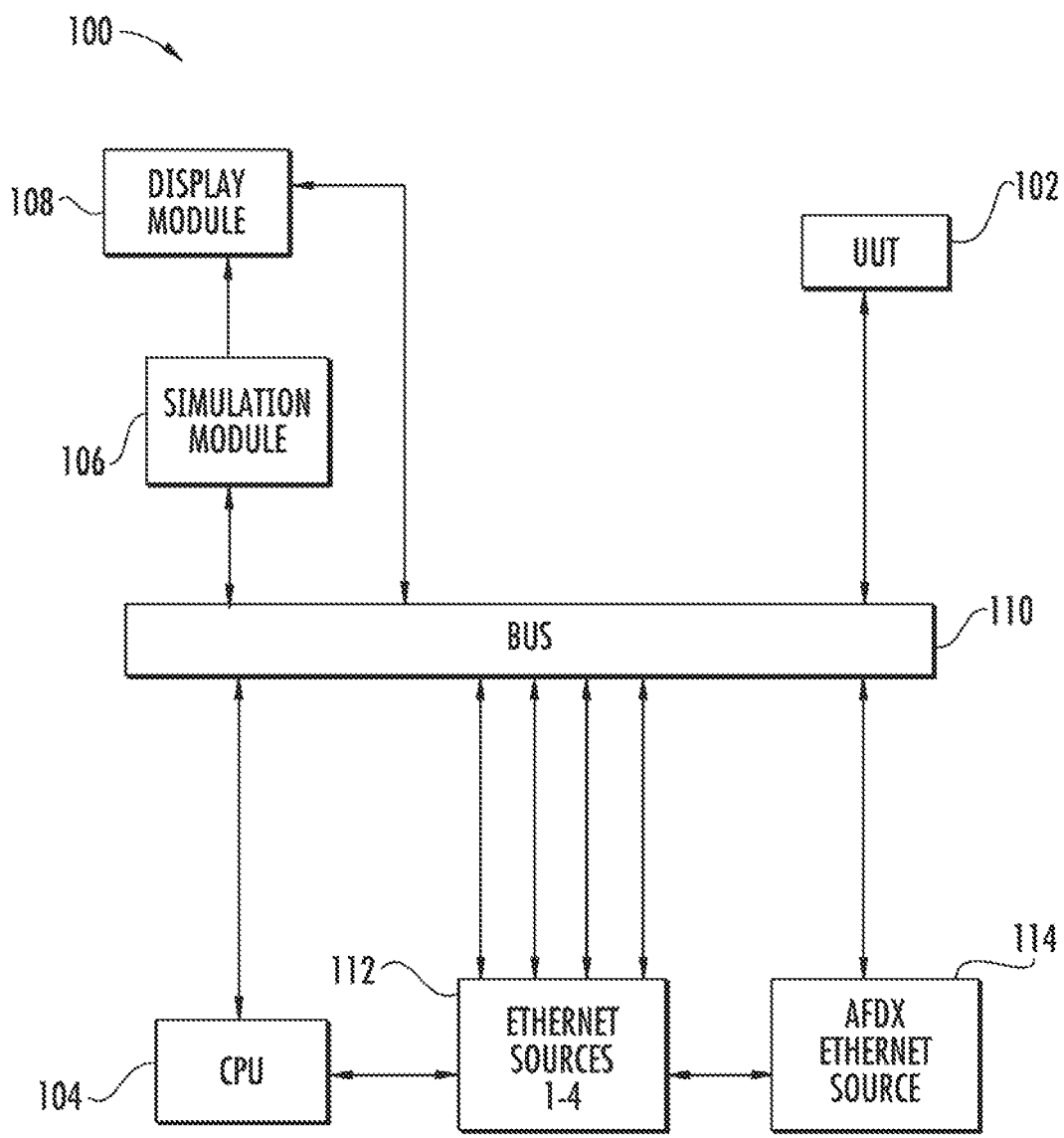
FIG. 1 is a functional block diagram illustrating a computer network architecture of a simulated Avionics Full DupleX (AFDX) network environment for a unit under test (UUT) in which the claimed embodiment may operate.

FIG. 1 illustrates a functional block diagram of a simulated Avionics Full DupleX (AFDX) network 100 for automated testing of a unit under test (UUT) 102. The simulated AFDX network 100 is a 10 base-T or 100 base-T Ethernet based network and UUT 102 is any line replaceable unit (LRU) Ethernet communication device. Such devices include, but not limited to, Ethernet hubs, switches, and routers.

In a conventional avionics Ethernet and/or AFDX Ethernet based network, a plurality of network components intercommunicate instructions among connected devices. For example, an AFDX switch may interconnect an AFDX Ethernet network with a conventional Ethernet network comprised of LRUs. The Ethernet and AFDX network components perform their standard functionality of selectively interchanging packets of data between the networks and among the various connected devices. Similarly, in simulated avionics network 100 a plurality of network components, including conventional Ethernet network devices 112 and AFDX Ethernet device 114 intercommunicate with UUT 102. Conventional Ethernet network devices 112 simulate the various LRUs in an AFDX network and AFDX Ethernet device 114, routes the information in simulated AFDX network 100.

Data is transmitted and received among and between UUT 102, Ethernet network devices 112, and AFDX Ethernet device 114 in accordance with test instructions stored in central processing unit (CPU) 104. Simulation module 106 samples Ethernet signals over bus line 110 and modifies the Ethernet signals according to conditions indicative of an AFDX network environment. Output data from the test is displayed for evaluation on display module 108 (e.g. oscilloscope) and/or transmitted to computer 104 for automated evaluation of the performance of UUT 102.

Figure 2:
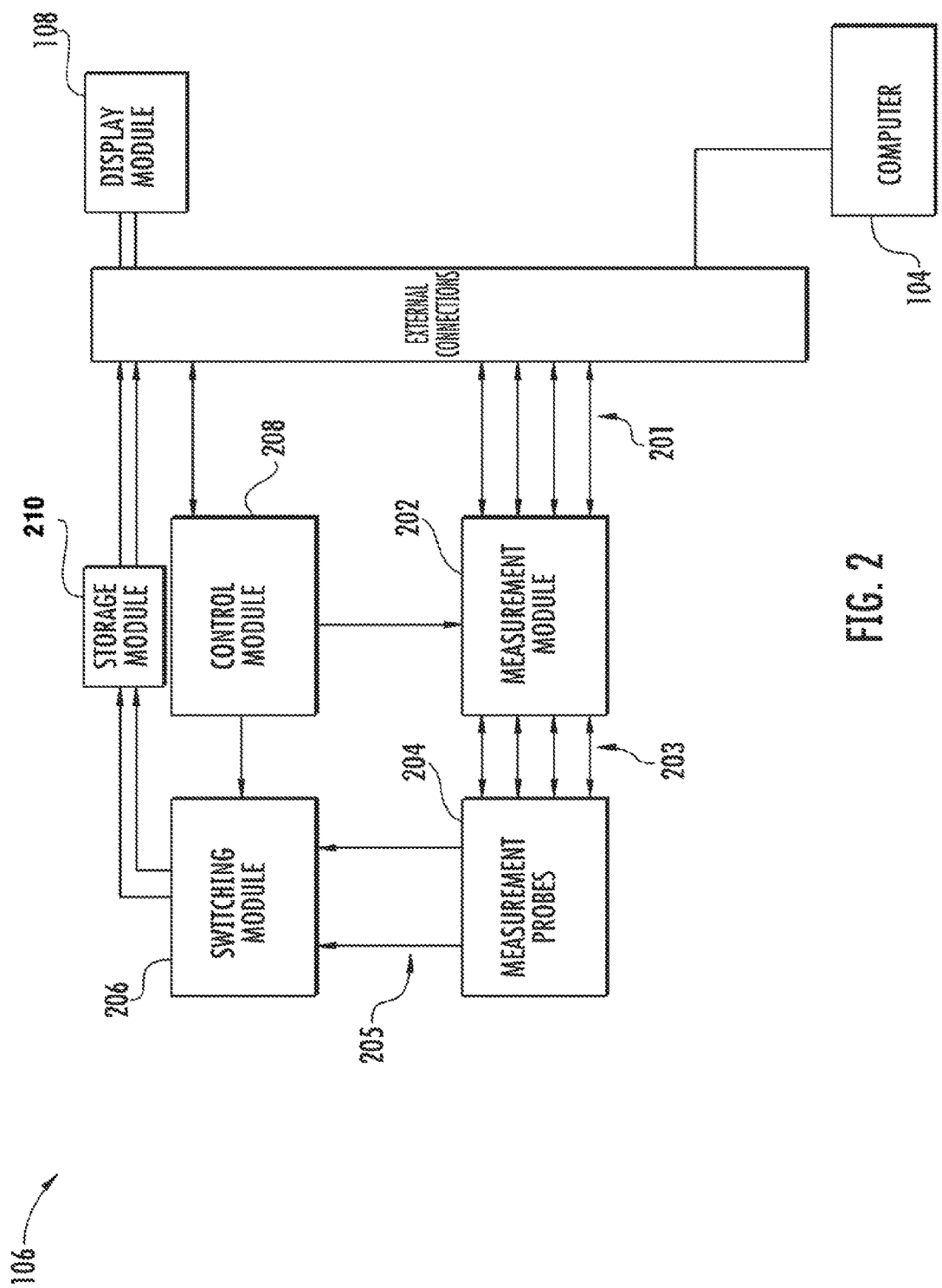
FIG. 2 is a functional block diagram of a simulation module of FIG. 1, in accordance with an exemplary embodiment.

Referring to FIG. 2, a functional block diagram of simulation module 106 is illustrated. Simulation module 106 includes an Ethernet measurement module (EMM) 202 to transmit and receive Full-Duplex Ethernet signals to and from UUT 102 and measure the parametric properties of the Ethernet signal communicated across either a 10 base-T or 100 base-T communication path. Full-Duplex Ethernet signals arrive in EMM 202 in dual pair signal lines, wherein each pair consists of a transmit and receive line. Thereafter, Full-Duplex Ethernet signals are attenuated by simulation circuits, such as RF attenuators, 10 base-T or 100 base-T simulation circuits, and/or a cable simulation circuit to produce modified Full-Duplex Ethernet signal indicative of an Ethernet signals in an AFDX network environment. Control module 208 in communication with CPU 104 automatically routes Ethernet signals arriving in EMM 202 through the various simulation circuits in order to automate parametric testing of UUT 102.

Modified Full-Duplex Ethernet signals are transmitted over lines 203 and measured by measurement probes 204. In an embodiment these probes are differential probes 204, such as the type manufactured by Tektronix and include multiple settings, such as DC reject, adjustable bandwidth, and attenuation settings to capture the Full-Duplex modified Ethernet signal and convert them to single-ended RF signals for transmission over single-ended lines 205.

Switching module 206 defines communication paths between EMM 202 and display device 108. In the exemplary embodiment, EMM 202 is configured to sample four distinct measurements; however, display device 108 is configured with only two channels. Switching module 206, comprising internal RF relays controlled by control module 208, defines communication paths between multiple measurement locations and the two channels in display device 108.

Measurement data is received and stored in a data storage module 210. Data storage module 210 is a memory module (e.g., DRAM) in the simulation module 106 or in display module 108, or alternatively stored on computer 104, described in detail below.

Data representative of the modified Ethernet signals is retrieved by display module 108 and or CPU 104 from storage module 210 for evaluation. Ethernet signals are evaluated according to their characteristics. Such characteristics include variations between the differential signal, amplitude symmetry, rise time, fall time, duty cycle distortion, transmit jitter, and overshoot. The acceptable range for the characteristics is defined by Aeronautical Radio, Inc. (ARINC) and its standards. Ethernet signal's received from UUT 102 must meet or exceed ARINC standards for deployment in an avionics network.

Display module 108, e.g. an oscilloscope, displays the Ethernet signals and evaluates the Ethernet signal's characteristics. Data representative of the Ethernet signal's characteristics is then transmitted to CPU 104 for storage and/or further evaluation. Thereafter, CPU 104 sends instructions to control module 208 to route Ethernet signals through the remaining simulation circuits for further evaluation.

Figure 3:
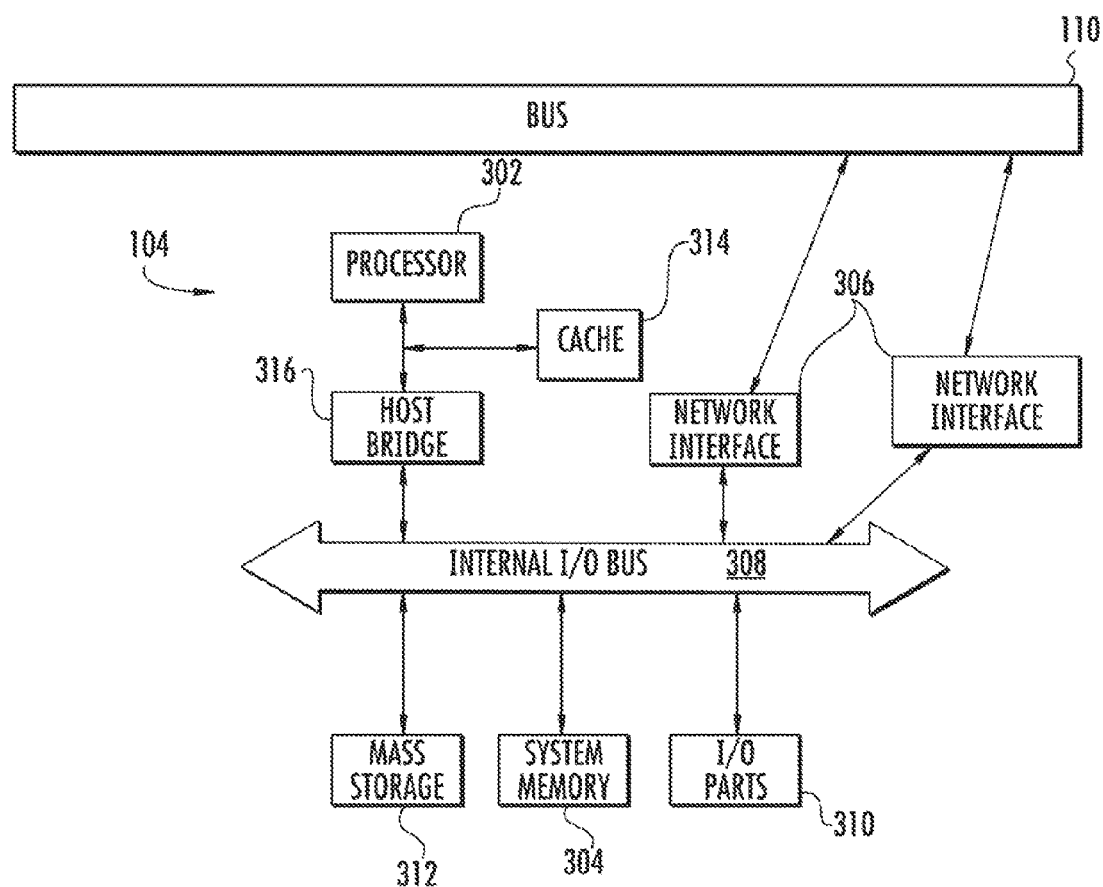
FIG. 3 is a functional block diagram illustrating hardware components of the control processor of FIG. 1, in accordance with an exemplary embodiment of the present invention.

FIG. 3 shows an exemplary computing platform residing in simulated avionics network 100. In one implementation, CPU 104 comprises a system including a processor 302, a system memory 304, network interfaces 306 and one or more software applications and drivers enabling or implementing the functions described herein. Network interfaces 306 combine with other device in simulated avionics network 100, such as simulation module 106, display device 108 and UUT 102 through bus 110. The hardware system includes a standard I/O bus 308 with I/O Ports 310 and mass storage 312 coupled, thereto. Host bridge 316 couples processor 302 to I/O bus 308. The hardware system may further include video memory (not shown) and a display device coupled to the video memory. Collectively, these elements are intended to represent a broad category of computer hardware systems, including but not limited to general purpose computer systems based on the Pentium processor manufactured by Intel Corporation of Santa Clara, Calif., as well as any other suitable processor.

Elements of computer hardware system perform their conventional functions known in the art. In particular, network interfaces 306 are used to provide communication between CPU 104 and Ethernet and/or AFDX networks. Mass storage 312 is used to provide permanent storage for the data and programming instructions to perform the above described functions implementing the test to be carried on UUT 102, whereas system memory 304 (e.g., DRAM) is used to provide temporary storage for the data and programming instructions when executed by processor 302. I/O ports 310 are one or more serial and/or parallel communication ports used to provide communication between additional peripheral devices, which may be coupled to CPU 104.

CPU 104 may include a variety of system architectures, and various components of CPU 104 may be rearranged. For example, cache 314 may be on-chip with processor 302. Alternatively, cache 314 and processor 302 may be packed together as a "processor module," with processor 302 being referred to as the "processor core." Furthermore, certain implementations of the claimed embodiments may not require nor include all of the above components. For example, additional components may be included in system 400, such as additional processors, storage devices, or memories.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A system for automated testing of Ethernet signals of a physical unit under test (UUT) in a simulated Avionics Full Duplex (AFDX) network environment, the system comprising:
    a measurement module adapted for connecting to the physical UUT and receiving Ethernet signals originating from the physical UUT and modifying the Ethernet signals according to a condition indicative of an AFDX network environment;
    a switching module coupled to the measurement module defining a path of communication of the modified Ethernet signals; and
    a data storage module receiving and storing data derived from the Ethernet signals, wherein the path is between the switching module and one of a plurality of channels of the data storage module.

2. The system of claim 1, wherein the measurement module further comprises an RF attenuator to attenuate the Ethernet signals.

3. The system of claim 2, wherein the measurement module further comprises a 10 Base-T Ethernet simulation circuit that attenuates a transmit signal of the Ethernet signals from the UUT.

4. The system of claim 1, further comprising a display module coupled to the plurality of channels of the data storage module.

5. The system of claim 4, wherein the display module is an oscilloscope.

6. The system of claim 1, further comprising the UUT.

7. The system of claim 6, wherein the UUT is a 24 port Ethernet switch.

8. The system of claim 1, wherein the switching module comprises RF switches to define the path of the modified Ethernet signals.

9. The system of claim 1, wherein the data storage module stores data representative of the characteristics of the modified Ethernet signals, such characteristics include at least one of a differential signal, amplitude symmetry, rise time, fall time, duty cycle distortion, transmit jitter, and overshoot.

10. A method for automated testing of Ethernet signals of a physical unit under test (UUT) in a simulated Avionics Full DupleX (AFDX) network environment, the method comprising:
   connecting a measurement module to the physical UUT;
   receiving Ethernet signals originating from the physical UUT;
   modifying the Ethernet signals according to a condition indicative of an AFDX network environment;
   defining a path of communication for the modified Ethernet signals to a data storage module; and
   transmitting the modified Ethernet signals on the defined path to a channel of the data storage module.

11. The method of claim 10, and further comprising attenuating the Ethernet signals.

12. The method of claim 11, and further comprising attenuating the Ethernet signals to a level indicative of a 10 Base-T Ethernet signal.

13. The method of claim 10, and further comprising displaying the modified Ethernet signals.

14. The method of claim 10, wherein defining the path of communication to the data storage module includes switching an RF relay to define the path for transmitting the Ethernet signals.

15. The method of claim 10, and further comprising measuring the modified Ethernet signals to determine characteristics of the Ethernet signals, which characteristics include at least one of a differential signal, amplitude symmetry, rise time, fall time, duty cycle distortion, transmit jitter, and overshoot.

16. A device for receiving Ethernet signals from a physical unit under test (UUT) and modifying the Ethernet signals in order to simulate an Avionics Full DupleX (AFDX) network environment, the device comprising:
   a measurement module adapted for connecting to the physical UUT and receiving the Ethernet signals originating from the physical UUT and modifying the Ethernet signals according to a condition indicative of an AFDX network environment;
   a measurement probe measuring the modified Ethernet signals; and
   a switching module receiving the measured Ethernet signals and defining a path of communication from the switching module.

17. The device of claim 16, wherein the measurement module further comprises an RF attenuator to attenuate the Ethernet signals.

18. The device of claim 16, wherein the measurement module further comprises a 10 Base-T Ethernet simulation circuit that attenuates the Ethernet signals from the UUT.

19. The device of claim 16, wherein the switching module receives directions from a controller for defining the path of communication from the switching module to one of a plurality of channels on an oscilloscope for displaying the measured Ethernet signal.

20. The system of claim 1, wherein the Ethernet signals received by the measurement module are Full-Duplex Ethernet signals.

21. The method of claim 10, wherein the Ethernet signals received from the UUT are Full-Duplex Ethernet signals.

22. The device of claim 16, wherein the Ethernet signals received by the measurement module are Full-Duplex Ethernet signals.

* * * * *